No. 820,857. PATENTED MAY 15, 1906.
C. H. FARRAR.
FRUIT AND VEGETABLE SLICER AND GRATER.
APPLICATION FILED MAY 19, 1905.
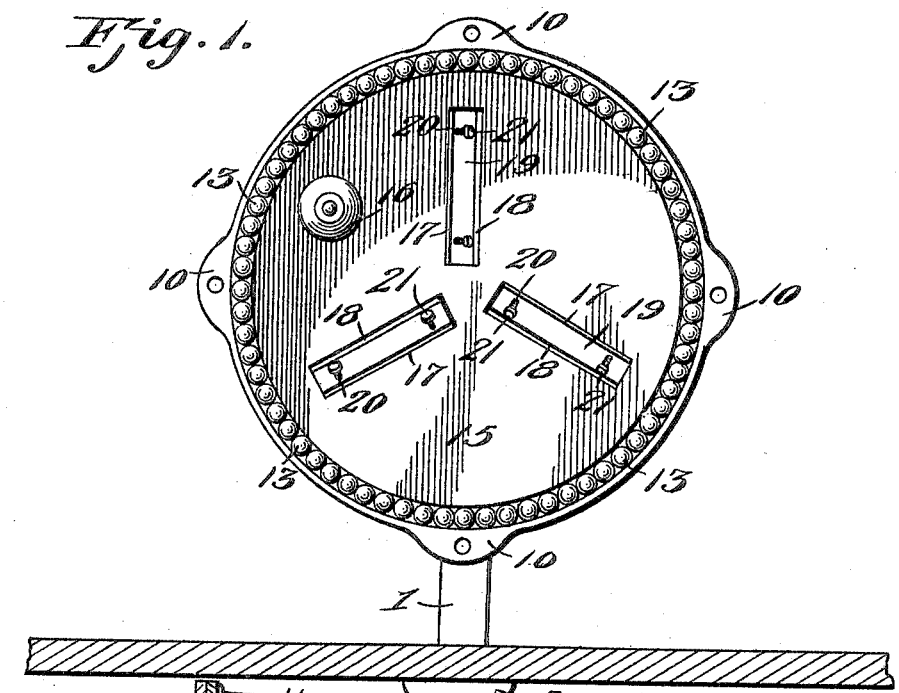
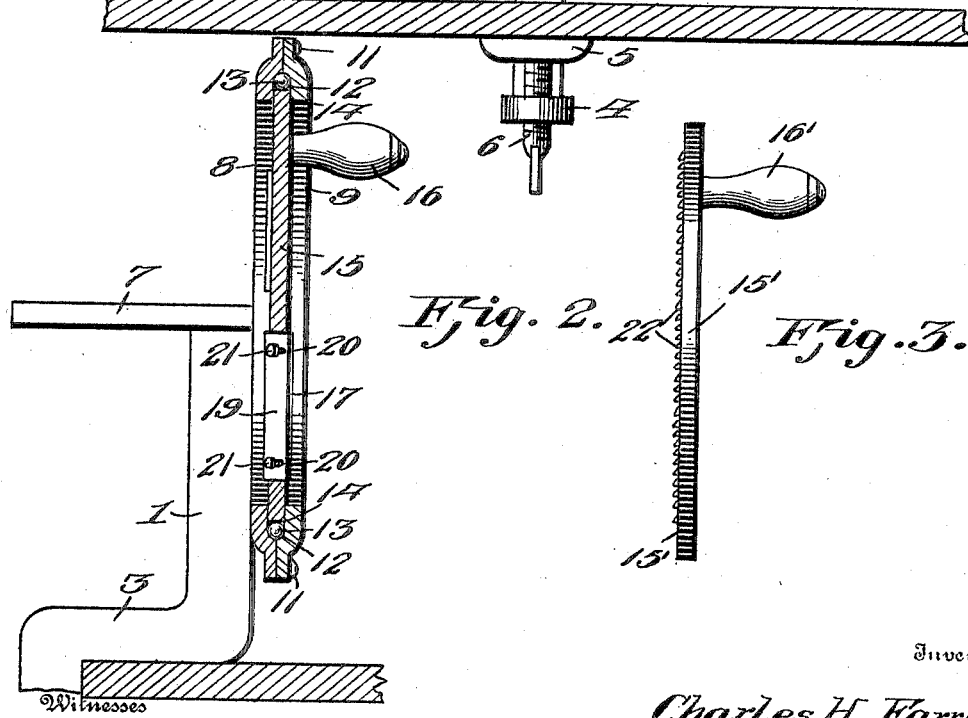
Witnesses
Frank B. Hoffman
C. C. Hines
Inventor
Charles H. Farrar
By Victor J. Evans
Attorney

UNITED STATES PATENT OFFICE.

CHARLES HUE. FARRAR, OF LILLY DALE, NEW YORK.

FRUIT AND VEGETABLE SLICER AND GRATER.

No. 820,857.  Specification of Letters Patent.  Patented May 15, 1906.

Application filed May 19, 1905. Serial No. 261,279.

*To all whom it may concern:*

Be it known that I, CHARLES HUE. FARRAR, a citizen of the United States, residing at Lilly Dale, in the county of Chautauqua and State of New York, have invented new and useful Improvements in Fruit and Vegetable Slicers and Graters, of which the following is a specification.

This invention relates to improvements in fruit and vegetable slicers and graters, the object of the invention being to provide a slicing and grating device which possesses superior advantages in point of simplicity of construction, inexpensiveness of manufacture, general efficiency, and ease of operation.

The preferred embodiment of the invention is illustrated in the accompanying drawings, in which—

Figure 1 is a front elevation of a slicer and grater embodying my invention, the outer ring of the frame being removed. Fig. 2 is a central vertical transverse section of the same, and Fig. 3 is an edge view of the grating-head.

Referring now more particularly to the drawings, the numeral 1 designates a supporting bracket or standard, which may be of any preferred construction, but in the form shown comprises a vertical standard 2, having a U-shaped base to engage the edge of a bench or table, the upper and lower arms 3 and 4 of said U-shaped base being adapted to extend above and below the table. The lower arm 4 carries a swiveled clamp 5, operated by an adjusting-screw 6, by which the bracket may be clamped to the table. The standard 2 supports at its upper end a horizontal bench or table 7, on which the fruits or vegetables to be cut are rested and fed up to the machine.

The cutter and grater comprises a frame composed of two annular or ring-shaped members 8 and 9, having their inner faces arranged in contact and provided at suitable points with projecting ears 10 for the passage of suitable fastenings 11 to detachably connect them together. The inner faces of the rims of the annular members are cut away or recessed to form an annular raceway 12 for the reception of bearing-balls 13 and to provide an entrance-slot 14 to said raceway.

Arranged within the frame is a rotary head or disk 15, whose edge is fitted to turn in the slot 14 with its periphery in contact with the bearing-balls 13. This disk or head is provided with an actuating crank-handle 16 and is formed with a series of slots 17, radiating from its center, each slot having an inclined side wall 18, adapted to support an inclined or angularly-set cutting-blade 19. Each of these cutting-blades is formed with transverse slots 20, through which project setscrews 21, entering threaded sockets in the inclined walls 18, whereby the blade is adjustably secured to the disk to regulate the size of the eduction-slot and the slices to be cut from the fruits or vegetables. The annular member 8 of the frame may be cast integral with the bracket 1 or formed independently thereof and suitably secured thereto.

In operation the fruit or vegetable to be sliced is placed upon the table 7 and fed up by one hand while the other is employed to rotate the head 15 through the medium of its crank-handle 16 in the usual way. The fruit or vegetable, whichever it may be, will thereby be cut into slices of the desired thickness, and these slices as they issue through the slot 17 may be caught in any suitable receptacle. It will be seen that by constructing the frame and arranging the ball-bearings in the manner described a simple and effective construction of device in which the cutter-head is adapted to be easily and rapidly operated is provided.

In Fig. 3 I have shown a disk or cutter-head 15′, provided with an actuating crank-handle 16′ and having upon its inner face grating-teeth 22. This head 15′ may be substituted for the cutter-head 15 by simply removing the outer frame-ring 9, as will be readily understood, thus rendering the head or disks interchangeable for cutting and grating purposes.

Having thus described the invention, what I claim as new is—

A device of the class described comprising a supporting-bracket, a vertically-disposed frame formed of a pair of rings, one of said rings being fixed to the bracket and both rings provided with ears, fastenings passing through said ears and detachably connecting the other ring to said fixed ring, the rim portions of said rings being grooved to mutually form a V-shaped annular raceway and an entrance-slot communicating therewith, and a rotary head or disk provided with means for acting upon the substances to be treated, said disk having its edge arranged to rotate in said slot, and bearing-balls arranged in said raceway and between and in contact with the meeting faces of the rims and the periphery of the disk.

In testimony whereof I affix my signature in presence of two witnesses.

CHARLES HUE. FARRAR.

Witnesses:
  WM. L. BAMBAM,
  CARL SCHNEIDER.